United States Patent [19]

Ducharme et al.

[11] Patent Number: 4,883,021

[45] Date of Patent: * Nov. 28, 1989

[54] ABSORBENT COMPOSITION

[75] Inventors: Cyril L. Ducharme, Long Lake; Ralph C. Eickhof, Erskine; David A. Heider, St. Paul; Denny W. Neiberger, Minnetonka, all of Minn.; Fred Maass, Oak Park, Ill.

[73] Assignee: Personal Pet Products Partnership, Minneapolis, Minn.

[*] Notice: The portion of the term of this patent subsequent to Mar. 3, 2005 has been disclaimed.

[21] Appl. No.: 157,915

[22] Filed: Feb. 19, 1988

Related U.S. Application Data

[63] Continuation-in-part of Ser. No. 909,966, Sep. 22, 1986, Pat. No. 4,727,824.

[51] Int. Cl.$^4$ ............................................. A01K 1/015
[52] U.S. Cl. ............................................. 119/1
[58] Field of Search ............................................. 119/1

[56] References Cited

U.S. PATENT DOCUMENTS

| | | | |
|---|---|---|---|
| 3,789,797 | 2/1974 | Brewer | 119/1 |
| 3,916,831 | 11/1975 | Fisher | 119/1 |
| 3,921,581 | 11/1975 | Brewer | 119/1 |
| 4,085,704 | 4/1978 | Frazier | 119/1 |
| 4,727,824 | 3/1988 | Ducharme et al. | 119/1 |

Primary Examiner—Robert P. Swiatek
Attorney, Agent, or Firm—Patrick J. Span

[57] ABSTRACT

An absorbent composition is disclosed which is particularly useful as an improved animal or pet litter composition, or as an absorbent for aqueous systems or oleophilic materials such as petroleum or vegetable oils and the like. Also disclosed is a method of making the improved absorbent composition and litter composition containing the same. The absorbent compositions include a nitrogen compound absorber such as cyclodextrin or other agents which form a matrix system or complex similar to cyclodextrin. Such other agents include polymerized cyclodextrin and cyclodextrin derivatives and polycarboxylic acid polymers such as acrylate polymers.

16 Claims, No Drawings

ABSORBENT COMPOSITION

This application is a continuation in part application of copending U.S. patent application Ser. No. 909,966, filed September 22, 1986, now U.S. Pat. 4,727,824.

BACKGROUND OF THE INVENTION

1. Field of the Invention

This invention relates to an absorbent composition useful as an absorbent for aqueous systems, including urine, particularly useful as an improved animal or pet litter composition, and useful as an absorbent for oleophilic materials such as petroleum or vegetable based oils and the like. The invention also relates to a method of making the improved absorbent composition and litter compositions containing same. The absorbent compositions include a nitrogen compound absorber such as cyclodextrin or other agents which form a matrix system or complex similar to cyclodextrin. Such other agents include polymerized cyclodextrin and cyclodextrin derivatives and polycarboxylic acid polymers such as acrylate polymers.

2. Description of Related Arts

Many attempts have been made in the past to provide improved absorbent compositions which are acceptable for use in animal litters, particularly for domestic pets such as cats. Generally known litter compositions available today contain large amounts of clay and/or natural grass compositions. In addition to being useful as animal litter compositions, such as compositions containing clays have also been suggested for use in absorbing oily materials commonly found in garage floors from automobiles. Such oleophilic or oily materials include the lubricating oils, kerosene, power steering fluids, transmission fluids and spills from gasoline and ethylene glycol antifreeze coolant compositions and spills of vegetable oils in food plants, such as when frying. Such compositions containing clays have not been entirely satisfactory and have been deficient in one or more of the characteristics and properties necessary as an effective absorbent, particularly for animal litter applications.

The desirable characteristics of an absorbent composition for animal litters include:

(a) high absorptive ability, particularly water or high moisture absorbency
(b) a reduced odor, particularly ammoniacal from urine waste products
(c) lack of toxicity
(d) low degree of dusting to avoid tracking and
(e) low cost, economically available ingredients of the composition.

Natural grasses, such as alfalfa have been employed in the past with a clay for a binder. While such natural grasses may contain some odor suppressant ability as a result of any chlorophyl present therein, alfalfa has a strong odor itself, particularly when wet. Other materials have been tried along with the alfalfa employing grain or grass straw, such as described in U.S. Pat. No. 4,258,660, which employs clay as a binder for maintaining the ingredients in a pelletized form, rather than for its moisture absorptivity property.

Other materials have been suggested in the past as a replacement for alfalfa, such as peanut hulls in U.S. Pat. 4,217,858, having the characteristics of a lubricant and/or binder. Among those having binder characteristics are clays and lignin such as sodium bentonite. Among the lubricants mentioned is starch. Reference is also made in the patent to processed corn cobs having been employed in the past.

In order to overcome odor problems, the use of fragrance releasing additives has been suggested as in U.S. Pat. 3,921,581, which incorporates consolidated particles having the property of fragrance release. The particles are composed of a minor amount of a perfume agent and major amount of a solid excipient of molded, finely divided or powdered solids of a binder and water sensitive disintegrant. The excipient may be all clay or include other finely divided cellulosic solids, such as saw dust, or chlorophyl containing solids, such as ground alfalfa. In addition to clays, the binder and water sensitive disintegrant may be water soluble or dispersible gums such as guar gum, microcrystalline cellulose or pregelatinized starch. The fragrance release composition is then blended with a porous expanded litter product prepared from equal parts by weight of ground alfalfa and gelatinized wheat flour.

In U.S. Pat. No. 3,059,615, an animal litter generally is described which is composed of acidic cellulosic materials which include dried grasses or hay, husks, saw dust, corn cob grits, excelsior and cereal hulls. The cellulosic materials are merely ground to a desirable size and spread with the acid solution.

Other patents generally dealing with alfalfa based animal litter with various binders, either alone or admixed with other absorbent materials are described in U.S. Pat. Nos. 4,206,718; 3,923,005; 3,972,971; 3,789,797 and U.S. Pat. No. 3,983,842, which describes other prior patents in the litter area.

SUMMARY OF THE INVENTION

An improved absorbent composition has now been found which is especially useful as an animal litter, which possesses moisture absorbency to a substantially greater degree than currently available litters which are composed of clays and alfalfas. Further, the compositions of this invention retain other desired advantages in that low cost materials are employed, which are non-toxic and which have a reduced odor, even when employed without added fragrance. The compositions have a low degree of dusting and retain their shape on wetting.

Broadly, the absorbent composition contains a major amount of a cellulosic material which is comprised of a cereal or grain hull, or peanut hulls, along or preferably in admixture with, a second cellulose material comprised of plant pulp, either vegetable or fruit pulp. The cellulosic material, hulls and pulp are ground to a desirable particle size and admixed with a minor amount of a suitable non-clay or clay free binder, up to about 20% by weight. Suitable non-clay binders are the carbohydrates, protein or mixtures thereof, such as flour and starch from plant sources. The cellulosic hull materials will generally be obtained from cereal grain sources such as corn, rice, wheat, oats and the like, soybean, sunflower and cotton seeds or peanut hulls. The plant pulp materials are generally obtained from vegetable sources such as beets, tomato, apple, grape or citrus pulp generally obtained for citrus fruits such as oranges, lemon, lime, grapefruit and the like. The carbohydrate binders are generally flours and starches from cereal grains such as corn, rice, wheat, oats and the like. Protein such as gluten found in wheat flour, or protein from bean or seed sources such as soybean or flaxseed and the like also provide suitable binders.

The use of the hulls material itself is generally sufficient to control odor. However, optionally a selective entrapment agent material may be employed such a cyclodextrin, which absorbs nitrogenous materials. If a fragrance additive is employed in the composition, the use of cyclodextrin will also provide for slow release of the fragrance. Particularly where fragrance additives are employed, plastic polymer systems, or crosslinkable natural gum polymers may be employed to absorb nitrogenous materials and/or to provide for slow release of any fragrance. Such materials are those which provide a matrix system similar to cyclodextrin.

The invention also concerns a method of preparing the absorbent composition by:
(a) grinding or pulverizing the cellulosic material hulls and pulp to a finely divided state
(b) mixing said finely divided cellulosic material with the starch or flour binder and with water to provide an extrudable mass
(c) extruding the mass through a die (preferably under heat and steam pressure to a porous expanded texture) and
(d) forming a particle, granule or pellet of the extruded mass as it leaves the die and
(e) drying the resulting pellet.

DETAILED DESCRIPTION AND PREFERRED EMBODIMENTS

As noted briefly above, the absorbent composition of the present invention in its broadest form is comprised of a major amount of a cellulosic hull material, alone or in admixture with a cellulosic plant pulp and a minor amount of a carbohydrate or protein binder. Optionally and preferably, the composition further contains, or is composed of, a nitrogenous compound absorbing agent such as cyclodextrin or other agents which form a matrix system similar to cyclodextrin, either a plastic polymer or crosslinkable natural gum polymer, or with which hydrogen bonding will enable absorption of the nitrogenous compound.

The first cellulosic material which may be used alone are various hull components of plants such as peanut hulls and cereal grain hulls from oats, rice, corn, wheat and the like, soybean, rapeseed, sunflower seed or cottonseed hulls. Peanut hulls are substantially the same composition as wood, or about 60% crude fiber, about 30% lignin and about 7% protein. Generally, hulls containing from about 50-80% cellulose are preferably employed.

From a cost standpoint oat hulls are preferred, as these are obtainable from companies who use oats for food products and need to dispose of the hulls. Such discarded hulls are either buried, burned or hauled away and disposed of by persons paid to do so. Accordingly, a large source of such hulls is readily available at minimal cost at this time. Peanut hulls are found available for much the same reasons. Sunflower hulls provide very desirable results in the absorbent composition, but are generally more expensive and less readily available.

The second cellulosic material which may be employed in admixture with the hulls is plant pulp, either vegetable or fruit. Beet pulp is readily available at reasonable cost and is the preferred source of vegetable pulp. Tomato pulp may also be employed. Citrus fruit pulp, available from processing of citrus fruit companies, are orange, lemon, lime, grapefruit and the like, with orange pulp being the most readily available. The fruit pulp from apples and grapes, which are also high in pectin may also be used.

Where mixtures of cellulosic materials from hulls and plant pulp are employed, the hull material is employed in an amount from about 50% of the total cellulosic material employed (hulls plus pulp). As indicated earlier, the cellulosic hull material may be employed alone and thereby comprise 100% of the cellulosic component. Generally, the plant pulp material, when employed, will be employed in an amount of from 10–50% of the cellulosic component. Preferably, equal weight ratios of about 1:1 hulls to pulp are employed. However, a weight ratio up to 5:1 hulls to pulp are advantageously employed. This flexibility affords an opportunity to minimize costs of cellulosic starting materials as the ratio of hulls to pulp can be varied over a relatively large range to take advantage of varying costs of the materials.

As indicated earlier, a carbohydrate or protein binder is employed. This carbohydrate binder can be any ground or refined plant product such as a flour or starch from plant sources. Such plant sources are cereal grains, tubers or roots. Generally, the flour as starch will be obtained from a cereal grain such as oats, corn, rice, rye, wheat and the like, with wheat starch or flour being preferred. Tuber or root starches include potato starch. When used herein, the term "flour" generally means the pulverized or ground product, which would include along with the starch therein the non-starch components such as the protein fraction, along with the oils and fats and the like. Starches as used herein are the refined carbohydrates after aqueous extraction of plant flour to remove the non-starch components, and includes the chemically modified starches which retain the binding properties of the unmodified starch.

The binder is employed in a minor amount of the composition relative to the cellulosic component. Thus, based on the weight of binder and cellulosic material, the binder will generally be employed in an amount of from about 2–25%, more desirably 10–20%, with about 15–20% being preferred.

As indicated earlier, the cellulosic hull material itself, or in combination with the cellulosic pulp, provides a degree of odor control. However, optionally an odor suppressant is used in the composition. This odor suppressant or control acts as a nitrogenous compound absorber. The nitrogenous absorber is preferably a cyclodextrin, or a material that provides a matrix or cavity system similar to cyclodextrin or which function through hydrogen bonding. Such other materials are (a) thermoplastic polymers which can also provide for encapsulation of a fragrance or (b) a crosslinkable natural gum, such as the polygalactomannan gums, xanthan gum or alginate.

Cyclodextrins are the preferred ingredient for control of odor as a nitrigenous compound absorber or selective entrapment agent. The cyclodextrins are cyclic oligosaccharides that contain at least six $\alpha$-1,4 linked D glucopyranose units. $\beta$-Cyclodextrin has 7 units, while $\alpha$ and $\gamma$ have 6 and 8 respectively. Cyclodextrins have the shape of a hollow truncated cone with primary and secondary hydroxy groups crowning opposite ends of the torus. The inside of the molecule provides an ability to admit various guest molecules into the inner cavity. The formation of an inclusion complex with the cyclodextrin will depend on the relative size and ionic nature of the guest molecule. While not wishing to be limited thereto, it is believed that nitrogenous compounds are absorbed as a guest molecule in the inner cavity of the cyclodextrin.

While cyclodextrin is the preferred material, other materials which form a matrix or complex similar to cyclodextrin may be employed in similar manner to act as the nitrogenous compound absorber. Compounds having a matrix, or forming a complex similar to cyclodextrin, include cyclodextrin derivatives and various polymers which are inert and non-toxic. Among the cyclodextrin derivatives which may be employed are cyclodextrin carbamates (such as shown in U.S. Pat. No.3459732) and the cyclodextrin polyol ether or polyethers (such as described in U.S. Pat. Nos. 3453259 and 3459731). Among suitable polymers are polymerized β-cyclodextrin which is available commercially from American Maize. Synthetic or plastic polymers may be employed. Illustrative of these polymers are acrylate polymers such as sold by Wickhen Products under the name POLYTRAP®. One such product is POLYTRAP 603. These products are described by the supplier as fully thermoset crosslinked acrylate polymers which are non-toxic and capable of entrapping a fragrance. Some of the copolymers are specifically described as polyglycerol acrylate and polypropyl acrylate. The polymers are generally polycarboxylic polymers consisting of monomer units of acrylic acid or methacrylic acid. Generally the carboxyl groups are esterified at least in part. In particular the alkyl esters, i.e. methyl, ethyl, propyl and butyl, and the glycerol esters are preferred. Examples of macromolecular compounds which are partially structured of monomer units with a free carboxylic acid group are highly polymerized co-polymerizates of acrylic acid and/or methacrylic acid with acrylic or methacrylic acid esters. The polymerisates may be obtained in powder form as well as an aqueous dispersion. These acrylate co-polymers are capable of carrying more fragrance than cyclodextrin and are accordingly generally employed in a smaller amount. This property is also believed to provide for slow fragrance release where a fragrance is added to the composition. While addition of a fragrance is not necessary, users of animal litters have become accustomed to the use of fragrances in commercial animal litters, and accordingly, the addition of a fragrance, which does not materially affect the basic litter composition of cellulosic materials and binder, will generally be included in the composition. Fragrances employed are natural or synthetic aromatic volatile compounds generally employed as a fragrance by those skilled in the fragrance art.

The nitrogen absorbing compound or ingredient may be employed in an amount of up to about 2% by weight of the total litter composition, preferably not more than about 1%. Where a fragrance is employed, the cyclodextrin may carry a 10% fragrance load, which at a 1% level of cyclodextrin would provide about 0.1% fragrance based on total composition. At a 0.1% cyclodextrin level, the fragrance level will accordingly be about 0.01% of the total composition, which is the preferred level of fragrance where such is employed. Other ingredients used as nitrogenous absorbers or selective entrapment and fragrance release agents may load fragrance at a higher level than cyclodextrin. For example, polymer systems may be capable of loading as high as 60% fragrances. Thus, the acrylate copolymers noted above are capable of carrying about 6 times more fragrance than cylocdextrin and accordingly may be employed in about one-sixth the amount required when cyclodextrin, or a cyclodextrin derivative, is employed. It is however preferred that the fragrance level be maintained at a level of about 0.01% fragrance based on total composition and, accordingly, the amount of such polymer system will be adjusted to provide that level of fragrance.

Other materials may be added, which do not materially affect the basic composition such as bacteriostats, dyes, anti-fungal, disinfectants, expansion and anti-dusting agents and the like.

The first step in the process of preparing the absorbent is to reduce the cellulosic components to a desirable particle size, preferably to a fine particle size on the order of powdered sugar. This is conveniently carried out by use of conventional hammer mills where the hulls or pulp are ground or pulverized in the hammer mill to a predetermined size. However, any method of particle sizing may be employed. It is desirable that the particles pass a number 50 sieve and preferably pass an 80 size, which is a finer particle size. In this application, all reference to sieve size is intended as reference to U.S. Standard Sieve Series Size. Generally, this provides particles less than about 0.02 inches, and preferably 0.01 or finer. Similarly, the particle size of the carbohydrate binder will be on the same order.

After the desired predetermined particle size is reached, the ingredients are mixed with water to provide a moisture content of about 30–45%, preferably about 40%, and pelletized by forcing the now plastic and pliable mass through appropriate dies of an extrusion pelletizing machine. The compositions of the present invention are of a slippery texture, like graphite and are easily extruded at low energy cost. If no fragrance is being included in the composition, the first stage of the extruder is at an elevated temperature. When fragrance is employed, it is preferred to introduce the mass at a relatively low temperature to avoid loss of the fragrance. Accordingly, the extrusion is run cold in the first step of the extruder, followed by somewhat elevated temperature in the subsequent stages. After the material passes through the dies, the pellets are cut, cooled and dried to provide pellets of the desired size.

If a significantly expanded product is not desired, the extrusion can be carried out at ambient room temperatures, i.e. 21-23° C. Some expansion may take place due to heat generated in the extrusion process. However, little expansion is found in the product. Such product is functional and useful in the present invention due to a wicking effect. In such a case, the pellet when contacted with moisture, i.e. urine in the case of animal litter, will expand on such contact and be a satisfactory absorbent.

In the extruder, pressures of about 440 psi are employed with temperatures of about 300–400° F., preferably 350–375° F. when elevated temperatures above ambient room temperature are employed. With an inlet moisture of about 40%, the resulting pellet prior to being dried has a moisture content on the order of about 20–25%. After drying, the pellet has a moisture content of about 3-10%, generally about 5-7%. The die size employed is one which will provide a particle, pellet or granule having a diameter of about 1/16 inch to 3/16 inch. On exit from the die, the pellet is cut at about 1/16 to 3/16 inch length. Preferably, the resulting pellet is about ⅛ inch in diameter and 1/16 inch length.

As the pellet exits the extruder, the product is significantly expanded and the final dried pellet will have a density of about 15-50 pounds per cubic foot and preferably about 20-30 pounds per cubic foot.

The process of preparing the absorbent composition particularly adapted for use as an animal litter accordingly comprises the step of:

(1) reducing a cellulosic hull material or plant pulp to a finely divided particle size,
(2) mixing said finely divided hull material, or a mixture thereof with finely divided cellulosic plant pulp, with a carbohydrate binder,
(3) moistening said mixture to provide a homogenous extrudable mass or dough,
(4) extruding the mass or dough at an elevated temperature to provide an expanded extrudate while sizing or shaping the extrudate,
(5) cutting the sized and shaped extrudate to the desired particle size and,
(6) drying the resultant particles.

The invention is best illustrated by the following examples in which all parts and percentages are by weight unless otherwise noted.

EXAMPLE 1

Several absorbent compositions were prepared using the materials identified in Table 1. The cellulosic hulls and pulp components were ground or milled to a particle size passing a 50 mesh U.S. Sieve Size. The carbohydrate binder, wheat flour, was of a comparable size, passing an 80 mesh sieve. Where fragrance was employed, it was incorporated in cyclodextrin at a 10% loading by weight thereof, providing a fragrance level of about 0.01% by weight of the total composition. The absorbent compositions of this invention were then evaluated and compared with commercially available animal litter compositions for absorbency and water holding capacity. The compositions of this invention were as follows in Table I below.

TABLE I

| Sample | Ingredient | Weight % |
|---|---|---|
| A | Rice Hulls | 40.0 |
| | Beet Pulp | 40.0 |
| | Wheat Flour | 20.0 |
| B | Peanut Hulls | 40.0 |
| | Beet Pulp | 40.0 |
| | Wheat Flour | 20.0 |
| C | Cottonseed Hulls | 40.0 |
| | Beet Pulp | 40.0 |
| | Wheat Flour | 20.0 |
| D | Soybean Hulls | 40.0 |
| | Beet Pulp | 40.0 |
| | Wheat Flour | 20.0 |
| E | Beet Pulp | 42.5 |
| | Oat Hulls | 42.5 |
| | Soft Wheat Flour | 14.9 |
| | Fragrance in Cyclodextrin | 0.1 |
| F | Oat Hulls | 84.9 |
| | Soft Wheat Flour | 15.0 |
| | Fragrance in Cyclodextrin | 0.1 |
| G | Oat Hulls | 64.9 |
| | Beet Pulp | 20.0 |
| | Soft Wheat Flour | 15.0 |
| | Fragrance in Cyclodextrin | 0.1 |

The samples were then extruded in a conventional extruder through a die at temperatures of about 350-375° F. and a pressure of about 15 psi. The expanded extrudate was cut off on exit from the extruder to a pellet size of about ⅛ inch diameter and a length of 1/16 inch. The pellet had a moisture content on exit in the range of 20-25%. The extruded pellets were then dried in a drying oven at a temperature of 90-130° F. to provide a moisture content of the pellets at about 5-7%.

The samples were evaluated, along with three commercially available animal litters designated X, Y and Z, respectively Tidy Cat 3, Litter Green and Kitty Litter, using the following procedures.

PROCEDURE

1. Place a funnel with a ceramic filter on a 100 ml graduated cylinder.
2. Add 100 grams of sample to the funnel.
3. Add 20 ml of distilled water to the sample on each filter.
4. When the water stops dripping, record the ml of water in the graduated cylinder.
5. Add 20 ml of water every 20 minutes for a total of 100 ml of water.
6. Record amount of water in graduated cylinder after each addition and 50 minutes after the 5th addition.

The results can be seen from the following Table II.

TABLE II

| | 1st 20 ml Amt. Thru | 2nd 20 ml Amt. Thru | 3rd 20 ml Amt. Thru | 4th 20 ml Amt. Thru | 5th 20 ml Amt. Thru | Drain 50 Min Amt. Thru |
|---|---|---|---|---|---|---|
| A | 5 | 9 | 10 | 10 | 10 | 10 |
| B | 0 | 1 | 1 | 1 | 1 | 1 |
| C | 0 | 0 | 0 | 0 | 0 | 0 |
| D | 0 | 0 | 0 | 0 | 0 | 0 |
| E | 1 | 2 | 2 | 2 | 2 | 2 |
| F | 4 | 5 | 6 | 7 | 8 | 8 |
| G | 6 | 9 | 9.5 | 9.5 | 9.5 | 9.5 |
| X | 0 | 0 | 0 | 7 | 24 | 26 |
| Y | 1 | 1 | 1 | 1 | 1 | 1 |
| Z | 0 | 0 | 0 | 5 | 21 | 21 |

The samples were then evaluated for water holding capacity (WHC) using the following procedure.

PROCEDURE

A. 5 Min. WHC

1. Weight 50 grams of litter into a 600 ml beaker.
2. Add 40-500 ml distilled water.
3. Stir twice.
4. Let sit 5 minutes.
5. Pour sample onto a U.S. #20 sieve.
6. Rinse remainder of sample from beaker onto the sieve.
7. Let sieve sit at an incline of 45° for 5 minutes.
8. Wipe water droplets from lip and outside of sieve.
9. Weigh sieve and sample.
10. Subtract tare weight of sieve.
11. Subtract 50 grams (the weight of the litter).

12. The remainder is the amount of water picked up by 50 grams when allowed to sit 5 minutes in an excess of water.

B. 1 Hour Test
Change Item 4 to 1 hour.
Change Item 5 to U.S. #60 sieve.
The results can be seen from the following Table III.

TABLE III

| Sample | Grams of Water Held By 50 Grams of Litter | Comments |
|---|---|---|
| A. 5 Minute Water Holding Capacity | | |
| A | 58.0 | Holds shape reasonably well |
| B | 52.7 | Holds shape reasonably well |
| C | 72.2 | Holds slight amount of shape |
| D | 64.3 | Holds slight amount of shape |
| E | 68.3 | Holds slight amount of shape |
| F | 37.3 | Holds shape reasonably well |
| G | 47.8 | Holds shape reasonably well |
| X | 29.5 | Holds little shape |
| Y | 113.3 | Does not hold any shape-mush |
| Z | 41.2 | Holds very little shape |
| B. One Hour Water Holding Capacity | | |
| A | 211.8 | Pellets don't hold their shape |
| B | 239.1 | No shape |
| C | 274.8 | No shape |
| D | 315.7 | No shape |
| E | 328.4 | No shape |
| F | 112.1 | Pellets appear to retain shape until slight pressure is applied |
| G | 178.1 | No shape |
| X | 42.31 | Retains some shape |
| Y | 136.9 | No shape |
| Z | 50.5 | Retains some shape |

The samples of the present invention have virtually no odor in the absence of fragrance. The fragrance employed will of course determine the type of odor. In use with urine samples, the samples of the absorbent composition of the present invention will entrap or absorb the nitrogenous compounds, and more so when 0.1% cyclodextrin is incorporated into the composition.

If the cyclodextrin derivatives are employed in place of the cyclodextrin in the formulations noted, these are employed in amounts at about the same level as cyclodextrin. With the POLYTRAP acrylate polymers described earlier, as these can carry a higher load, the compounds are generally employed in a smaller amount, preferably on the order of 1% or less, i.e. 0.05 to 0.1%.

The products of the present invention provide a much greater area of absorption through the absorbent composition layer than animal litters available to date. As the water or urine is deposited on the top surface of the litter and is absorbed on its downward path, a widening zone of absorption is noted, to provide a cone of wetted absorption area with the top surface are being the apex of the cone. With present day litters, much of the moisture and urine pasess downward in a relatively small area of finds its way to the bottom of the litter pan. With the composition of the present invention, a wide cone area is seen due to the greater absorptivity, and an increased wicking effect so that a lesser amount of urine or moisture reaches the lower surface at the litter pan.

Because of the greater absorptivity, the compositions are also useful for the absorption of other materials besides aqueous solutions such as urine. Accordingly, the compositions find utility and are useful in cleaning garage floors from spills or leaks of such materials as oil, power steering or transmission fluids, kerosene, ethylene glycol antifreeze solutions and the like, or for absorption of any oily materials such as petroleum or vegetable based oils. Since the absorbent composition holds moisture so well, and in view of its biodegradability, the composition will also find utility as a fertilizer, a mulch for gardens and for potting plants.

We claim:

1. An absorbent composition comprising
   (i) a major amount of a cellulosic component,
   (ii) a minor amount of about 2-25% by weight of a binder based on the total weight of cellulosic material and binder, and
   (iii) a nitrogenous compound absorber, said binder consisting essentially of a material selected from the group consisting of carbohydrate, protein and mixtures thereof; said cellulosic component comprising:
      (a) from 50-100% by weight of a cellulosic hull material selected from the group consisting of cereal grain hulls, peanut hulls, soybean, rapeseed, sunflower and cottonseed hulls, and mixtures thereof and
      (b) up to 50% by weight of plant pulp; said nitrogenous compound absorber being selected from the group consisting of polymerized cyclodextrin, cyclodextrin derivatives and polyacrylate compounds having a matrix system similar to cyclodextrin.

2. An absorbent composition as defined in claim 1 in which said nitrogenous compound absorber is present in an amount up to about 2% by weight of said absorbent composition.

3. An absorbent composition as defined in claim 2 in which said nitrogenous compound absorber is polymerized cyclodextrin and is present in an amount of about 1% and carries a fragrance present in an amount of about 0.01% by weight of said absorbent composition.

4. An absorbent composition as defined in claim 1 in which said nitrogenous absorber is a polyacrylate polymer selected from the group consisting of polyglycerol acrylate and polypropyl acrylate.

5. An absorbent composition in claim 1 and further containing a volatile aromatic fragrance.

6. An absorbent composition as defined in claim 1 wherein said cereal grain hull is selected from the group consisting of oat, rice, wheat, rye and corn hulls.

7. An absorbent composition as defined in claim 1 wherein said plant pulp is a pulp selected from the group consisting of beet pulp, tomato pulp, apple, grape and citrus pulp.

8. An absorbent composition as defined in claim 1 wherein said binder is plant derived flour or starch.

9. An absorbent composition as defined in claim 8 wherein said flour or starch is derived from a plant source selected from the group consisting of oats, corn, rice, rye and wheat.

10. An absorbent composition as defined in claim 1 wherein said binder is wheat flour.

11. An absorbent composition as defined in claim 1 wherein said cellulosic component is solely oat hulls.

12. An absorbent as defined in claim 1 wherein the ratio by weight of hulls to pulp is in the range of about 1:1 to 5:1.

13. An absorbent as defined in claim 1 wherein said binder composition comprises about 15-20% by weight of the total absorbent composition.

14. An animal litter comprised of an absorbent composition comprising:

(i) a major amount of a cellulosic component,
(ii) a minor amount of about 2-25% by weight of a binder based on the total weight of cellulosic material and binder, and
(iii) a nitrogenous compound absorber, said binder consisting essentially of a material selected from the group consisting of carbohydrate, protein and mixtures thereof; said cellulosic component comprising:
  (a) from 50-100% by weight of a cellulosic hull material selected from the group consisting of cereal grain hulls, peanut hulls, soybean, rapeseed, sunflower and cottonseed hulls, and mixtures thereof, and
  (b) up to about 50% by weight of plant pulp; said nitrogenous compound absorber being selected from the group consisting of polymerized cyclodextrin, cyclodextrin derivatives and polyacrylate compounds having a matrix system similar to cyclodextrin.

15. An oleophilic absorbent composition comprised of an absorbent composition comprising:
(i) a major amount of a cellulosic component,
(ii) a minor amount of about 2-25% by weight of a binder based on the total weight of cellulosic material and binder, and
(iii) a nitrogenous compound absorber, said binder consisting essentially of a material selected from the group consisting of carbohydrate, protein and mixtures thereof; said cellulosic component comprising;
  (a) from 50-100% by weight of a cellulosic hull material selected from the group consisting of cereal grain hulls, peanut hulls, soybean, rapeseed, sunflower and cottonseed hulls, and mixtures thereof, and
  (b) up to 50% by weight of plant pulp; said nitrogenous compound absorber being selected from the group consisting of polymerized cyclodextrin, cyclodextrin derivatives and polyacrylate compounds having a matrix system similar to cyclodextrin.

16. An animal litter comprised of expanded pellets of an absorbent composition comprising:
(i) a major amount of a cellulosic component,
(ii) a minor amount of about 2-25% by weight of a binder based on the total weight of cellulosic material and binder, and
(iii) a nitrogenous compound absorber, said binder consisting essentially of a material selected from the group consisting of carbohydrate, protein and mixtures thereof; said cellulosic component comprising:
  (a) from 50-100% of a cellulosic hull material selected from the group consisting of cereal grain hulls, peanut hulls, soybean, rapeseed, sunflower and cottonseed hulls, and mixtures thereof, and
  (b) up to about 50% by weight of plant pulp; said nitrogenous compound absorber being selected from the group consisting of polymerized cyclodextrin, cyclodextrin derivatives and polyacrylate compounds having a matrix system similar to cyclodextrin.

* * * * *